United States Patent [19]

Okita

[11] Patent Number: 4,533,369

[45] Date of Patent: Aug. 6, 1985

[54] GAS-PERMSELECTIVE COMPOSITE MEMBRANES AND PROCESS FOR THE PRODUCTION THEREOF

[75] Inventor: Koichi Okita, Osaka, Japan

[73] Assignee: Sumitomo Electric Industries, Ltd., Osaka, Japan

[21] Appl. No.: 576,647

[22] Filed: Feb. 3, 1984

Related U.S. Application Data

[63] Continuation-in-part of Ser. No. 382,981, May 28, 1982, abandoned.

[51] Int. Cl.³ .............................................. B01D 53/22
[52] U.S. Cl. ........................................ 55/158; 55/16; 264/22; 427/40; 427/41
[58] Field of Search ................. 55/16, 158; 210/500.2, 210/506; 264/22; 427/38–41

[56] References Cited

U.S. PATENT DOCUMENTS

| | | | |
|---|---|---|---|
| 3,497,451 | 2/1970 | Hoehn et al. | 210/500.2 X |
| 3,567,810 | 3/1971 | Baker | 210/500.2 X |
| 3,657,113 | 4/1972 | Stancell et al. | 55/16 X |
| 3,709,841 | 1/1973 | Quentin | 210/500.2 X |
| 3,775,308 | 11/1973 | Yasuda | 210/500.2 X |
| 3,846,521 | 11/1974 | Osterholtz | 55/16 X |
| 3,847,652 | 11/1974 | Fletcher et al. | 210/500.2 X |
| 3,855,122 | 12/1974 | Bourganel | 210/490 X |
| 3,992,495 | 11/1976 | Sano et al. | 210/500.2 X |
| 4,026,977 | 5/1977 | Bourganel | 210/500.2 X |
| 4,046,843 | 9/1977 | Sano et al. | 210/500.2 X |
| 4,155,793 | 5/1979 | Salemme et al. | 156/246 |
| 4,163,725 | 8/1979 | Sano et al. | 210/500.2 X |
| 4,199,448 | 4/1980 | Johnson et al. | 210/500.2 X |
| 4,230,463 | 10/1980 | Henis et al. | 210/500.2 X |
| 4,239,793 | 12/1980 | Matsuura et al. | 55/16 X |
| 4,264,338 | 4/1981 | Null | 55/16 |
| 4,279,855 | 7/1981 | Ward, III | 264/298 |
| 4,347,139 | 8/1982 | Hayashi | 210/500.2 X |
| 4,410,338 | 10/1983 | Yamamoto et al. | 55/158 |
| 4,483,901 | 11/1984 | Okita et al. | 55/158 X |

*Primary Examiner*—Robert Spitzer
*Attorney, Agent, or Firm*—Sughrue, Mion, Zinn, Macpeak, and Seas

[57] ABSTRACT

A gas-permselective composite membrane, and a process for producing the composite membrane are described. This composite membrane comprises a heat-resistant porous polymeric membrane and a thin layer of a tertiary carbon or tertiary organic silicon-containing compound provided on one side of the membrane, the layer being prepared by polymerizing the compound by means of plasma. The membrane has highly permselective as well as superior strength and heat resistance.

12 Claims, No Drawings

GAS-PERMSELECTIVE COMPOSITE MEMBRANES AND PROCESS FOR THE PRODUCTION THEREOF

CROSS REFERENCE

This application is a continuation-in-part application of Ser. No. 382,981 filed May 28, 1982 now abandoned.

BACKGROUND OF THE INVENTION

The present invention relates to gas-permselective composite membranes and a process for the production thereof. More particularly, it relates to gas-permselective composite membranes comprising a thin layer of cross-linked structure provided on one side of a heat-resistant porous support, the thin layer being prepared by polymerizing tertiary carbon-containing compounds or tertiary organosilicon compounds by means of plasma. Also, the present invention relates to a process for producing the membranes.

In recent years, increasing number of extensive studies have been made to achieve separation and purification of fluid mixtures by the use of permselective membranes in place of conventional techniques such as distillation and low temperature processing, which are accompanied by changes in phase and consume a lot of energy as described in U.S. Pat. Nos. 4,230,463 and 4,264,338.

Separation and purification of fluid mixtures using membranes has already been put to practical use in several fields. For example, the conversion of sea water into fresh water, disposal of waste water from factories, and the concentration of foods have all been carried out on a commercial scale using appropriate membranes. These processes, however, are liquid-liquid separation and liquid-solid separation. However, gas-gas separation on a commercial scale is practically unknown.

It is difficult to commercially perform the separation of gases using a membrane (hereinafter sometimes referred to as "membrane-separation") because; (1) the permselectivity of conventional membranes is poor (More specifically, there is no suitable membrane which selectively allows specific gases to pass therethrough. While essentially blocking other gases making it possible to obtain high purity gas and therefore, it is necessary to employ a multi-stage process wherein the membrane-separation is performed repeatedly, which leads to increases in the size of the apparatus); and (2) the gas permeability is poor, which makes it difficult to process a large amount of gas. Furthermore, when the permselectivity of the membrane is increased, the gas permeability tends to be reduced. However, when gas permeability is increased, the permselectivity tends to be decreased. This makes it difficult to perform membrane-separation on a commercial scale.

In order to achieve commercial membrane-separation, various methods of producing improved membranes have been proposed. Typical examples include a method in which casting of a polymer solution is employed to produce an unsymmetrical membrane wherein the thickness of an active skin layer is made as thin as possible, and a method in which a super-thin membrane corresponding to the above active skin layer is prepared independently and stuck together to a porous support to form a composite membrane as described in U.S. Pat. Nos. 3,497,451, 4,155,793 and 4,279,855. These methods, however, fail to provide satisfactorily improved membranes although they are standard procedures to improve gas permeability. The reason for this is that there are no commercially available polymers or copolymers which meet all the required physical properties, e.g., permselectivity, gas permeability, heat-resistance, chemical resistance, and strength.

From the viewpoints of heat resistance and strength various materials can be chosen from porous polymerous materials now commercially available. Porous polysulfone, polyimide, and so forth may be used, but cellulose ester, polyvinyl chloride, polypropylene, polycarbonate, polyvinyl alcohol, etc. are not much preferred. In view of heat resistance and strength, a porous support made from a polytetrafluoroethylene is most preferred. Furthermore, it has the advantage that its chemical resistance is satisfactorily high.

With regard to gas permeability, the polytetrafluoroethylene is not suitable. Materials having satisfactory gas permeability include various rubbers such as silicone rubbers (e.g., dimethyl siloxane and phenyl siloxane), natural rubber, and polybutadiene. These rubbers, however, suffer from the serious defect of poor strength. It is possible to incorporate a silica filler into such rubber materials for the purpose of improving the strength. Incorporation of such fillers, however, is not preferred since it deteriorates gas permeability.

As a result of various investigations, it has been found that polymeric compounds containing a tertiary carbon atom in the recurring unit thereof have excellent gas permselectivity and, furthermore, those compounds containing a tertiary organic silicon in place of the above tertiary carbon atom are also excellent in gas permselectivity. However, these polymers are inferior in heat resistance, strength, and chemical resistance.

SUMMARY OF THE INVENTION

Therefore, an object of the present invention is to provide an improved membrane which does not merely employ a single material meeting all the above physical properties, but which combines different materials having their own excellent physical properties.

Another object of the present invention is to provide a composite membrane having a gas-permselectivity which is useful in concentrating oxygen from the air, separating hydrogen from petroleum gas, etc.

It has now been found according to the invention that when monomers containing a tertiary carbon atom or tertiary organic silicon are polymerized by glow-discharging under reduced pressure of 1.0 Torr or less, preferably 0.5 Torr or less, to form a thin membrane on a heat resistant porous support, there can be obtained a composite membrane which is greatly improved not only in permselectivity but also in strength and heat resistance.

The present invention, therefore, provides;

(1) a gas-permselective composite membrane comprising a heat-resistant porous support and a thin layer of cross-linked structure provided on one side of the support, said thin layer being prepared by polymerizing a tertiary carbon containing compound represented by general formula (I) or tertiary organic silicon-containing compound represented by general formula (II) or (III) by means of plasma:

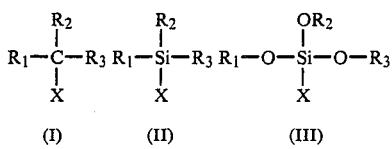

(I)    (II)    (III)

wherein X is a saturated aliphatic hydrocarbon radical an unsaturated aliphatic hydrocarbon radical, an aromatic hydrocarbon radical, a heterocyclic radical, halogen, hydroxy group, an amino group, a substituted amino group or a halogenamino group and one of $R_1$, $R_2$ and $R_3$ is a hydrogen atom or a methyl group, and the rest two thereof, which may be the same or different, each is a methyl group or an ethyl group, and (2) a process for producing a gas-permselective composite membrane which comprises feeding a tertiary carbon or tertiary organic silicon-containing compound into an atmosphere of 0.5 Torr or less under glow discharge and polymerizing it to form a thin membrane on a heat-resistant porous support.

DETAILED DESCRIPTION OF THE INVENTION

In the above formulae, examples of the saturated aliphatic hydrocarbon radical represented by X include an alkyl group (e.g., methyl, ethyl, pentyl, etc.), an alkoxy group (e.g., methoxy, ethoxy, etc.) and the like. Examples of the unsaturated aliphatic radical represented by X include an alkenyl group (e.g., vinyl, allyl, 3-butenyl, 2-butenyl, 4-pentenyl, etc.), an alkynyl group (e.g., an ethynyl, etc.), and the like. Examples of the aromatic hydrocarbon radical represented by X includes a phenyl group, etc. Examples of the heterocyclic radical represented by X include an imidazolyl group, etc. Examples of the substituted amino group represented by X include a dimethylamino group, a trimethylsililamino group, etc. Examples of the halogen include chlorine, fluorine, etc.

In general formula (I), the tertiary carbon atom corresponds to the central carbon atom of the above formula.

Of the compounds represented by general formula (I), compounds having simple structures include tert-butylamine, tert-butyl alcohol, and tert-butylchloride. Typical examples of the compounds of general formula wherein X is a hydrocarbon radical include saturated compounds, such as isopentane and isooctane, and unsaturated compounds, such as pentene derivatives, e.g., 4-methyl-1-pentene, 4-methyl-2pentene, 2,4,4-trimethyl-1-pentene, and 4,4-dimethyl-1pentene, and octene derivatives, e.g., iso-octene.

Compounds which can be introduced in a gaseous state into the glow discharge atmosphere are limited to relatively low boiling compounds (below 200° C., preferably below 150° C.) having a vapor pressure of about 5 to 760 Torr. Thus, compounds containing less than 20 carbon atoms, preferably from up to about 15 carbon atoms, and most preferably 4 to 10 carbon atoms, can be used in the present invention whereas compounds containing 20 or more carbon atoms are not employable practically.

Of the above-described compounds, compounds which are partially substituted by fluorine are advantageous from a viewpoint of ease of plasma-polymerization and increased chemical resistance. Further, compounds of the above formulae in which each of $R_1$, $R_2$ and $R_3$ represents a methyl group are superior in the boiling point range and ease of production to those containing the ethyl group although compounds in which one or two of $R_1$, $R_2$ and $R_3$ represent an ethyl group can also be used in the present invention.

Examples of the tertiary organic silicon-containing compounds as used herein represented by the following formulae (II) and (III) include trimethylchlorosilane, trimethylfluorosilane, trimethylmethoxysilane, methyltrimethoxysilane, trimethoxyphenylsilane, and additionally, various aminosilane compounds can be used. For plasma polymerization, however, compounds not containing a halogen atom, such as tetramethylsilane, hexamethyldisilazane, dimethylaminotrimethylsilane, and trimethylsilylimidazole, are preferred. Compounds containing a function group such as a vinyl group, an ethynyl group, an allyl group, etc., e.g., vinyltrimethylsilane, vinyltrimethoxysilane, and vinyltris(β-methoxyethoxy)silane are advantageous with respect to the rate of polymerization.

In the compounds, dehydrogenation or growth of vinyl radicals causes the main chain to grow. Upon the growth of the main chain, there is formed a polymeric compound in which branches comprising recurring methyl side chains are linked to the main chain. On the other hand, side chains growing from the main chain which has been dehydrogenated by plasma form long branches. The frequency of cross-linking between part of the branches are the main chain increases as the branch grows, finally resulting in the formation of three-dimensional net-like structure. As the proportion of the three-dimensional net-like structure increases, the strength becomes greater and heat deformation properties are reduced. This leads to an improvement in heat resistance.

The compounds specified in the invention have a tertiary or tertiary type structure prior to the plasma polymerization thereof.

With a thin membrane in which a huge number of branches corresponding to the methyl groups from tertiary or tertiary type structure are formed onto the main chain and side chain, its crystallinity becomes much lower and its free volume becomes much larger, and there is formed a structure which makes it possible to sufficiently detect fine differences in size between gas molecules. This will increase the permselectivity of the thin membrane. It is said that the mean collision radius of hydrogen at atmospheric pressure is 2.9 Å, and that of methane is 3.8 Å. In the case of a membrane comprising dimethylsiloxane, for example, its hydrogen permeability is nearly the same as the methane permeability. In fact, methane having a larger collision radius than hydrogen passes through the membrane about 1.2-times faster than the hydrogen. This is supposed to be ascribed to the branch of methyl groups.

The thickness of the thin membrane to be formed on a support by plasma polymerization varies depending on the time for which the tertiary carbon or tertiary organic silicon-containing compound is supplied under glow discharge, the flow rate of the compound supplied, the high frequency output, and so forth. The glow discharge can be carried out under conditions as described e.g., in U.S. Pat. Nos. 3,775,308 and 3,847,652, that is, at a pressure of 1.0 Torr or less, preferably 0.5 Torr or less and at an output of 15 to 100 W preferably 20 to 80 W. The thin membrane preferably has a thickness of 1 micron or less and more preferably a thickness of 0.3 micron or less in view of its gas-permselectivity.

The support which can be used in the present invention is a heat resistant porous polymer membrane composed of polysulfones, polyimides, cellulose esters, polyvinyl chlorides, polypropylene, polycarbonates, polyvinyl alcohols, polytetrafluoroethylenes, etc., with polytetrafluoroethylene being preferred. Preferably, the porous support has a porosity of 30 to 80% and a pore diameter of not larger than 0.2µ, preferably not larger than 0.1µ.

When the thin membrane is formed by plasma polymerization under such conditions as to adjust the thickness to 1 micron or less, preferably 0.3 micron or less, if the adhesion between the thin membrane and the support is poor, or the pore diameter of the support is too large, there is a tendency for defects to develop therein. No suitable technique to prevent such defects from occurring has heretofore been known.

Various methods have been proposed for that purpose, including a method in which the pore diameter of the porous support is reduced as described in U.S. Pat. Nos. 3,567,810, 3,709,841, 3,855,122 and 4,026,977. There are, however, only few methods capable of solving the above problem while meeting the required physical properties, such as heat resistance and strength.

Another feature of the invention is that by filling the inside of pores in the heat-resistant porous support with a siloxane compound exemplified by silicone rubber, and thereafter, by performing plasma polymerization, the adhesion between the thin membrane thus formed and the support is increased and at the same time, the pore diameter of the support is decreased reducing the occurrence of defects in the thin membrane.

These siloxane compounds can be cross-linked inside the pores of the heat-resistant porous support, as is with the usual silicone rubber, by the use of organic peroxides, aliphatic acids, azo compounds, sulfur, etc., or by means of radiation.

In the gas-permselective membrane not only materials per se have excellent characteristics, but also constitutional elements governing the permeability should be as thin as possible.

The characteristics of material is evaluated by the unit of coefficient of gas permeation:

$$P = cm^3 \cdot cm/cm^2 \cdot sec \cdot cmHg$$

This is calculated with the thickenss of the material as 1 cm. On the other hand, with the composite membrane, the evaluation is performed by the unit:

$$P = cm^3/cm^2 \cdot sec \cdot cmHg$$

which is the permeation speed at the thickness of material per se. That is, although the permeation speed of a membrane having a thickness of 1 micron is 10 times that of a membrane having a thickness of 10 microns, their coefficients of permeation are the same. In practice, the value of the permeation speed is necessary.

As a result of extensive studies on a method of curing siloxane compounds, it has been found that when the surface layer, which comes into contact with plasma in a plasma atmosphere using unpolymerizable gas (such as air, $N_2$, Ar, Ne, preferably Ne, Ar), is cross-linked or cured, uncured siloxane compounds can be extracted and removed from the surface layer of the heat-resistant porous support, which does not come into contact with the plasma.

Thus there is obtained a membrane of unsymmetrical structure comprising one surface layer which is composed of the siloxane compound cross-linked by plasma, and the reverse surface layer in which the siloxane compound is extracted and removed, and no siloxane compound remains. The thickness of the cured portion is not larger than 1µ.

In order to make easier the step of cross-linking by plasma and the step of extracting and removing the uncured siloxane compound, it is preferable to employ intermediate molecular weight polymers generally called silicone oil rather than using uncured raw rubber.

The visocity (at 25° C.) of silicone oil exemplified by dimethylsiloxane, which is commercially available, ranges from 0.65 cs to 1,000,000 cs. When the viscosity is as low as 20 cs or less, the volatility is high, resulting in the dissipation of the oil in the plasma atmosphere. On the other hand, when the viscosity is as high as 50,000 cs or more, it becomes difficult to fill the pores of the heat-resistant porous support with the silicone oil. Furthermore, an additional problem develops in that the silicone oil not only enters the pores of the support, but also excessively attaches to the surface of the support.

The silicone oil excessively attaching to the surface undergoes cross-linking by means of plasma. In extracting and removing the uncured component, however, it is liable to peel apart from the porous polymeric membrane. Accordingly, a product having uniform quality cannot be obtained. Also, when uncured raw rubber except for silicone oil is used to fill the pores of the heat-resistant porous support, the problem of the rubber excessively attaching to the surface of the support arises as in the case of high viscosity silicone oil. The use of intermediate molecular weight silicone oil makes it possible to reduce the amount of the oil being attached to the surface.

In order to further reduce the amount of the oil being attached onto the surface, it is preferable to utilize the thermal expansion and contraction action of the siloxane compound. The siloxane compound is heated to 100° to 150° C. to cause an expansion in volume and a reduction in viscosity. In the state that the volume is increased and the viscosity is reduced, the siloxane compound is used to impregnate the heat-resistant porous support therewith. After the impregnation is completed, an excess of siloxane compound attaching to the surface of the support is squeezed out therefrom. Thereafter, when the support is cooled to room temperature, a contraction in volume of about 10% occurs, and the siloxane compound remaining on the surface is absorbed into the pores of the support. In any event, dimethylsiloxane having a viscosity ranging from 30 cs to 300,000 cs is preferred.

After the siloxane compound is formed into a cross-linked structure, a thin membrane formed by plasma polymerization and having a thickness of 1 micron or less, preferably 0.3 micron or less, may be laminated on the surface. For this purpose, the inside of the reactor is maintained at a reduced pressure of 0.5 Torr or less, preferably 0.2 Torr or less, and a mixed gas of the unpolymerizable gas and polymerizable gas of the compound represented by general formula (I), (II) or (III) which is the same as is used in the formation of the thin membrane on the support is introduced thereinto. When glow discharge is developed in the reactor by the generation of high frequency at a predetermined output of from 10 to 100 W, preferably 20 to 80 W, the polymerizable gas undergoes plasma polymerization to form a thin membrane. When compounds having a tertiary or tertiary type structure which have unsaturated bonds and are highly reactive are used it is preferred to use an output of 20 to 40 W while an output of 40 to 80 W is preferable when compounds having a tertiary or tertiary type structure to be used do not contain any unsaturated bond. Lamination of the thin membrane on the surface layer of a composite material comprising the cross-linked siloxane compound and the heat-resistant porous polymeric membrane proceeds in the same manner as described for the support having no siloxane compound thereon.

A composite membrane prepared under very limited conditions as described above exhibits excellent characteristics in the selective permeation of gas mixtures, and thus, greatly contributes to industry as an energy-saving gas-separation method.

The composite membrane of the present invention is particularly useful in separating oxygen from the air and hydrogen from coke oven gas.

The invention is explained in detail with reference to the following examples.

EXAMPLE 1

FLUOROPORE FPO45 (a porous membrane of a polytetrafluoroethylene, produced by Sumitomo Electric Industries, Ltd.; mean pore diameter: 0.45 micron) was impregnated with a two-fold dilution solution of SILICONE OIL KF-96 (dimethylsiloxane, produced by Shin-Etsu Silicone Co., Ltd.: 30,000 cs) with methyl ethyl ketone, and thereafter, the methyl ethyl ketone was evaporated. The membrane was heated to 150° C., and the silicone oil appearing on the surface of the membrane was removed with a sponge roll. Then, the membrane was allowed to cool.

The membrane was exposed to a plasma atmosphere of 50 W high frequency output, 13.56 MHz, and 0.2 Torr nitrogen gas for 15 minutes. Then, uncured silicone oil was extracted with methyl ethyl ketone. The membrane was again placed in the plasma apparatus, into which 4-methyl-1-pentene vapor was then introduced along with nitrogen gas and plasma polymerization was performed for 20 minutes.

The gas permeability of the composite membrane thus prepared was measured. The permeation speeds of oxygen and nitrogen were $1.2 \times 10^{-5}$ cm$^3$/cm$^2$·sec·cmHg and $3.4 \times 10^{-6}$ cm$^3$/cm$^2$·sec·cmHg, respectively, and thus, the coefficient of selective permeation was 3.5.

EXAMPLE 2

A polytetrafluoroethylene membrane with a siloxane compound cross-linked in the pores was prepared in the same manner as in Example 1. On the membrane thus formed was provided a thin membrane of each of the tertiary organic silicon-containing compounds shown in Table 1 by means of plasma polymerization. The gas permeability of each membrane was measured with the results shown in Table 2.

TABLE 1

| Run No. | Compound | Plasma Polymerization Conditions | | |
|---|---|---|---|---|
| | | High Frequency Output (Watts) | Pressure (Torrs) | Polymerization Time (Minutes) |
| 1 | Tetramethylsilane | 10 | 0.4 | 30 |
| 2 | Dimethylaminosilane | 60 | 0.4 | 15 |
| 3 | Vinyltriethoxysilane | 80 | 0.1 | 20 |
| 4 | Vinyltrimethylsilane | 30 | 0.3 | 20 |

TABLE 2

| Run No. | Permeation Speed of Oxygen ($P_{O_2}$) | Permeation Speed of Nitrogen ($P_{N_2}$) | Coefficient of Selective Permeation ($\alpha\, O_2/N_2$) |
|---|---|---|---|
| 1 | $7.0 \times 10^{-5}$ | $2.9 \times 10^{-5}$ | 2.4 |
| 2 | $1.6 \times 10^{-5}$ | $5.7 \times 10^{-6}$ | 2.8 |
| 3 | $2.4 \times 10^{-5}$ | $8.9 \times 10^{-6}$ | 2.7 |
| 4 | $2.2 \times 10^{-6}$ | $5.5 \times 10^{-7}$ | 4.0 |

While the invention has been described in detail and with reference to specific embodiments thereof, it will be apparent to one skilled in the art that various changes and modifications can be made therein without departing from the spirit and scope thereof.

What is claimed is:

1. A gas-permselective composite membrane comprising:
    a heat-resistant porous polymeric membrane; and
    a thin layer of cross-linked structure provided on one side of said membrane, said thin layer being prepared by plasma polymerizing, at an atmosphere of 1.0 Torr or less under glow discharge of from 20 to 80 W, a compound selected from the group consisting of 4-methyl-1-pentene, 4-methyl-2-pentene, 2,4,4-trimethyl-1-pentene, 4,4-dimethyl-1-pentene, tert-butylamine, and their fluorine-containing derivatives, or from the group consisting of vinyl trimethylsilane, hexamethyldisilazane, dimethylaminotrimethylsilane, and trimethylsilylimidazole.

2. The composite membrane as claimed in claim 1, wherein the thin layer of cross-linked structure has a thickness of 0.3 micron or less.

3. The composite membrane as claimed in claim 1, wherein a siloxane compound is cross-linked in the pores of the heat-resistant porous polymeric membrane 4. The composite membrane according to claim 3, wherein the membrane support has an unsymmetrical structure comprised of one surface layer which contains the siloxane compound cross-linked by plasma and a reverse surface layer which does not contain any siloxane compound.

5. The composite membrane according to claim 4, wherein the siloxane compound which is cross-linked is a silicone oil.

6. The composite membrane as claimed in claim 1, wherein the heat-resistant porous polymeric membrane is made of a polytetrafluoroethylene, and has a structure comprising fibers and knots.

7. The composite membrane according to claim 1, wherein the thin-layer cross-linked structure contains a main chain and side chains, and branches comprising recurring methyl groups are linked to the main chain and side chains.

8. A process for producing a gas-permselective membrane, comprising the steps of:

providing a heat-resistant porous polymeric membrane as a support;

feeding a compound selected from the group consisting of 4-methyl-1-pentene, 4-methyl-2-pentene, 2,4,4-trimethyl-1-pentene, 4,4-dimethyl-1-pentene, tert-butylamine, and their flourine-containing derivatives, or from the group consisting of vinyl trimethylsilane, hexamethyldisilazane, dimethylaminotrimethylsilane, and trimethylsilylimidazole, said compound being fed into an atmosphere of 1.0 Torr or less under glow discharge of from 20 to 80 W in order to polymerize the compound and form a thin membrane; and depositing the thin membrane on the heat-resistant porous polymeric membrane.

9. The process as claimed in claim 8 wherein a siloxane compound is cross-linked in the pores of the heat-resistant porous polymeric membrane by cross-linking in a plasma atmosphere of unpolymerizable gas at a pressure of 1.0 Torr or less.

10. The process as claimed in claim 9, wherein uncured siloxane is extracted and removed from the surface of the heat-resistant porous polymeric membrane support which does not come into contact with the plasma used to cross-link the siloxane.

11. The process according to claim 10, wherein the siloxane compound which is subjected to cross-linking is a silicone oil.

12. The process according to claim 11, wherein the membrane support is impregnated with the silicone oil, the membrane suppport is heated, an excess of the silicone oil which appears on the surface of the membrane support is removed, the membrane support is cooled, and the membrane support is exposed to the plasma to effect cross-linking of the silicone oil.

* * * * *